United States Patent

Holland

[11] Patent Number: 5,860,613
[45] Date of Patent: Jan. 19, 1999

[54] FILM CARTRIDGE

[75] Inventor: Ronald Bland Holland, Greenwood, S.C.

[73] Assignee: Milliken Research Corporation, Spartanburg, S.C.

[21] Appl. No.: 235,538

[22] Filed: Apr. 29, 1994

Related U.S. Application Data

[63] Continuation-in-part of Ser. No. 58,329, May 10, 1993, abandoned.

[51] Int. Cl.$^6$ .................................................. G03B 17/26
[52] U.S. Cl. ........................................ 242/348.4; 396/513
[58] Field of Search ............................ 242/348.4, 538.4, 242/588.5; 354/275, 277; 139/383 R, 383 A; 428/85, 91; 26/15 R, 29 R; 396/513

[56] References Cited

U.S. PATENT DOCUMENTS

| | | | |
|---|---|---|---|
| 2,012,184 | 8/1935 | Cobb | 26/29 R |
| 3,063,126 | 11/1962 | Tingas | 26/29 R |
| 3,096,561 | 7/1963 | McNally et al. | 28/72 |
| 3,865,678 | 2/1975 | Okamoto et al. | 428/91 |
| 4,103,054 | 7/1978 | Okamoto et al. | 26/29 R X |
| 4,167,600 | 9/1979 | Benzaquen | 428/91 |
| 4,568,590 | 2/1986 | Iwai | 428/85 |
| 4,730,778 | 3/1988 | Akao et al. | |
| 5,158,118 | 10/1992 | Tate et al. | 139/383 A |
| 5,205,506 | 4/1993 | Mizuno et al. | |
| 5,217,179 | 6/1993 | Sugiyama | |
| 5,219,128 | 6/1993 | Mizuno | |
| 5,234,176 | 8/1993 | Mizuno | |
| 5,308,009 | 5/1994 | Mizuno | 242/348.4 |
| 5,358,198 | 10/1994 | Lesley | 242/348.4 |

FOREIGN PATENT DOCUMENTS

| | | |
|---|---|---|
| 0 217 227 | 4/1987 | European Pat. Off. . |
| 0 452 900 A2 | 10/1991 | European Pat. Off. . |
| 0 466 192 A3 | 1/1992 | European Pat. Off. . |
| 3346495 | 6/1984 | Germany . |

*Primary Examiner*—John M. Jillions
*Attorney, Agent, or Firm*—Terry T. Moyer; Earle R. Marden

[57] ABSTRACT

A container for a strip (12) of light-sensitive material includes an elongated opening for withdrawing the material from the container. Strips (22) of light-locking material are provided on both sides of the opening, the strips being made from a napped and sheared woven fabric (12, 14). The fabric is dyed, dried, napped, sheared and heat set prior to preparation of the strips. A method of producing such a light-locking material is taught which includes steps of passing the woven fabric multiple times through napping and shearing operations to increase the pile density.

9 Claims, 7 Drawing Sheets

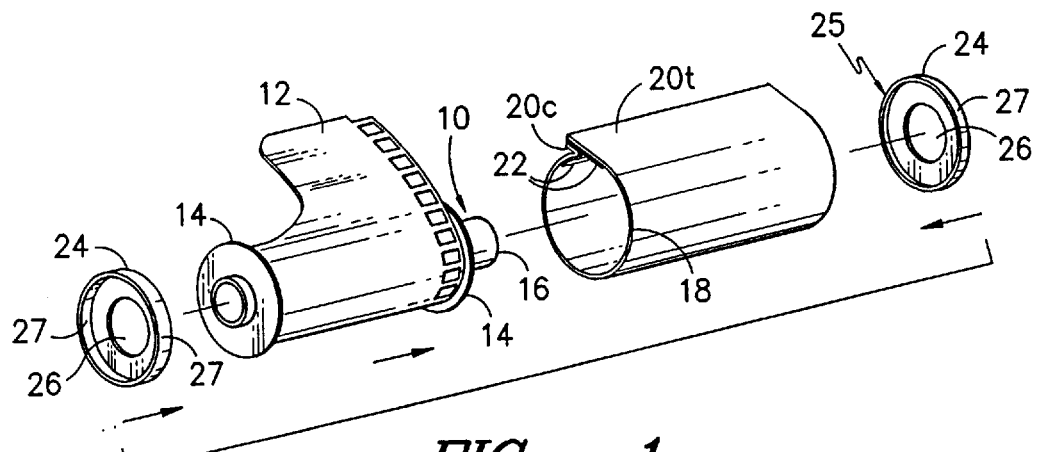
FIG. −1−
( PRIOR ART )
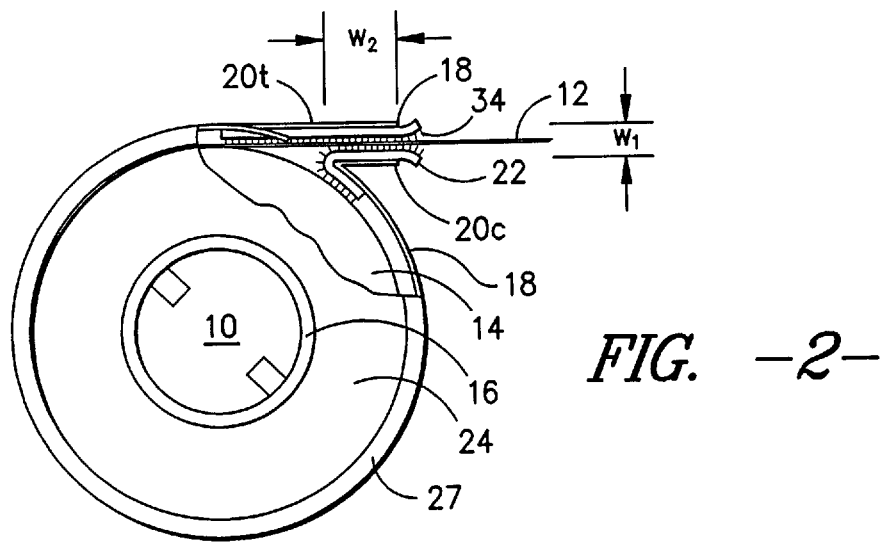
FIG. −2−
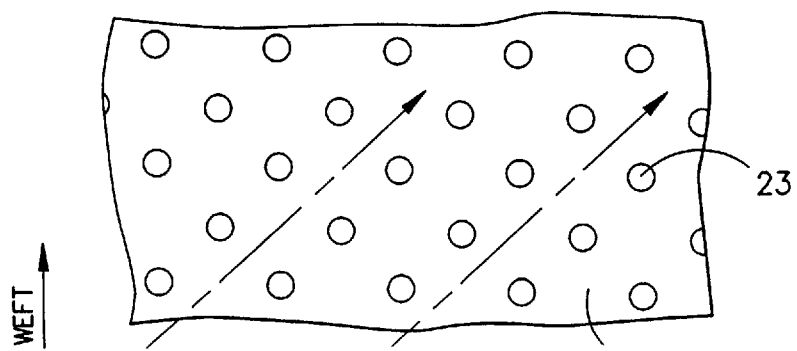
FIG. −2A−

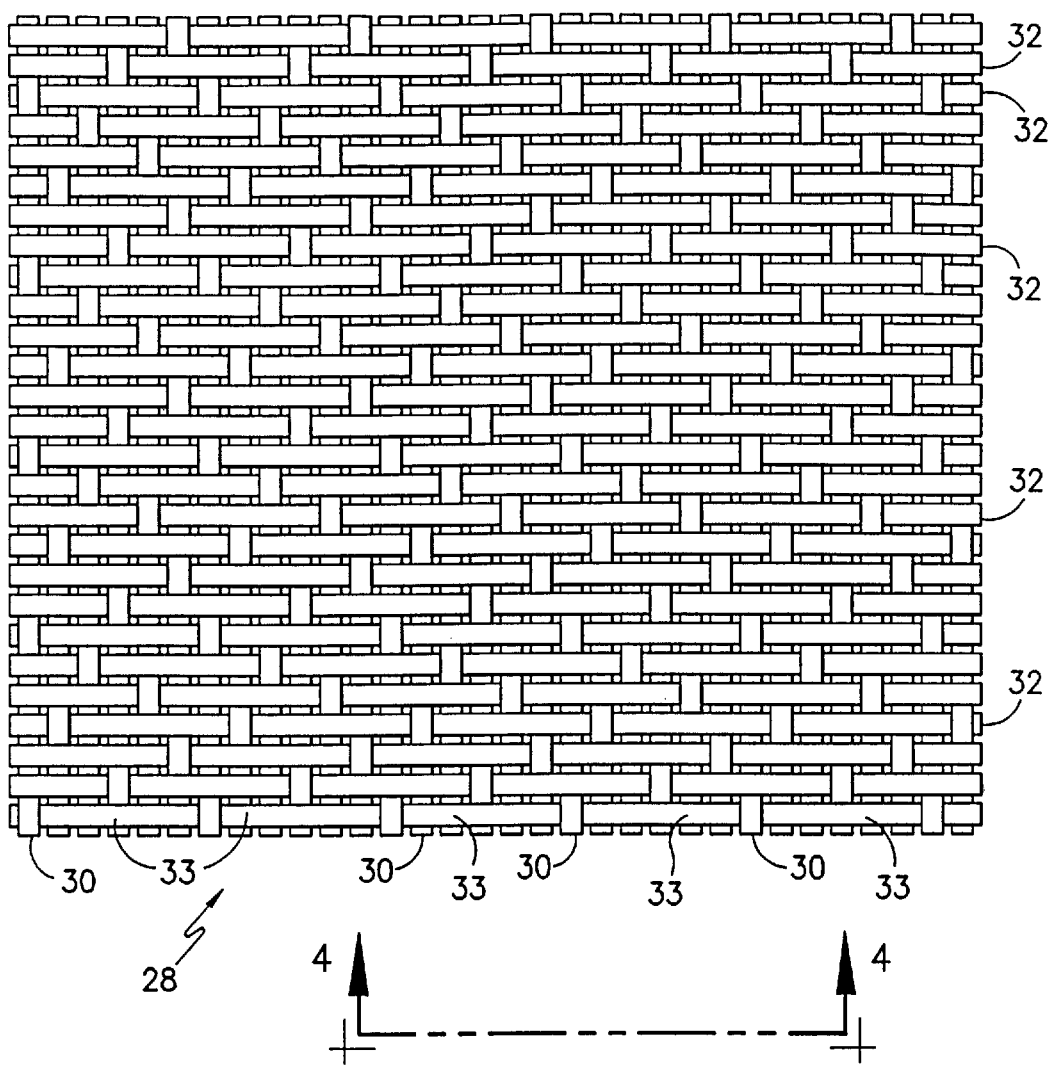
FIG. -3-
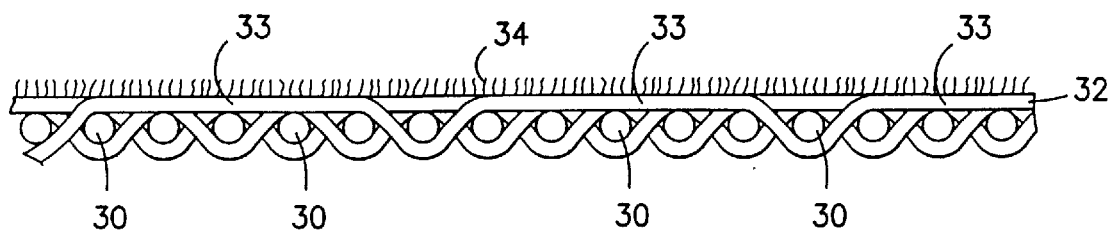
FIG. -4-

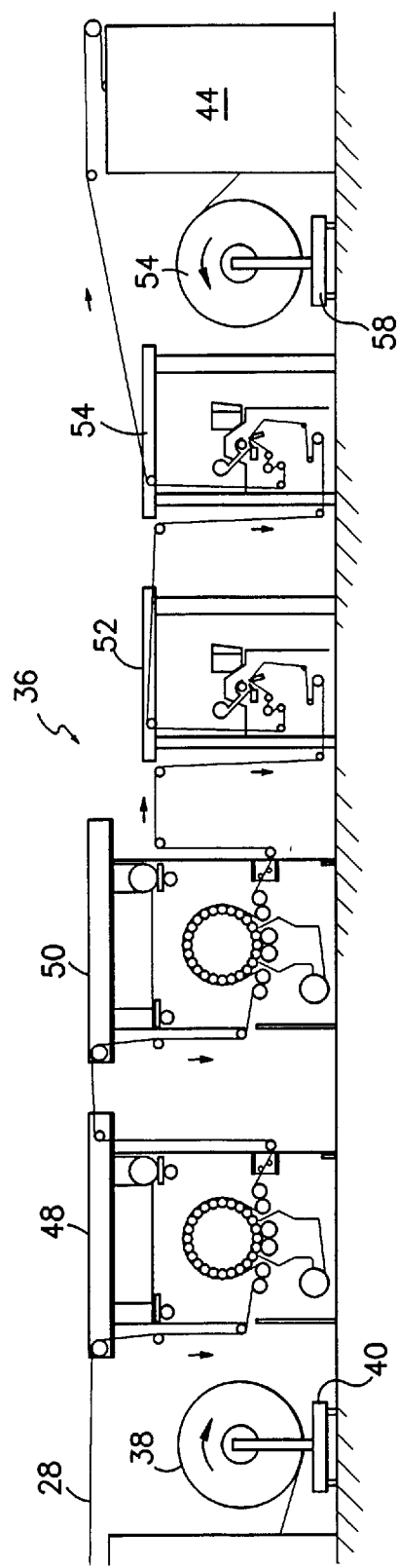
FIG. -5-

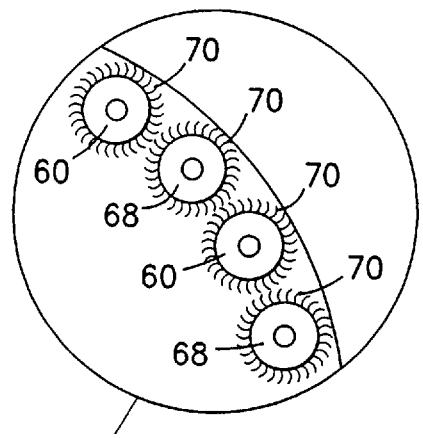
FIG. -6A-
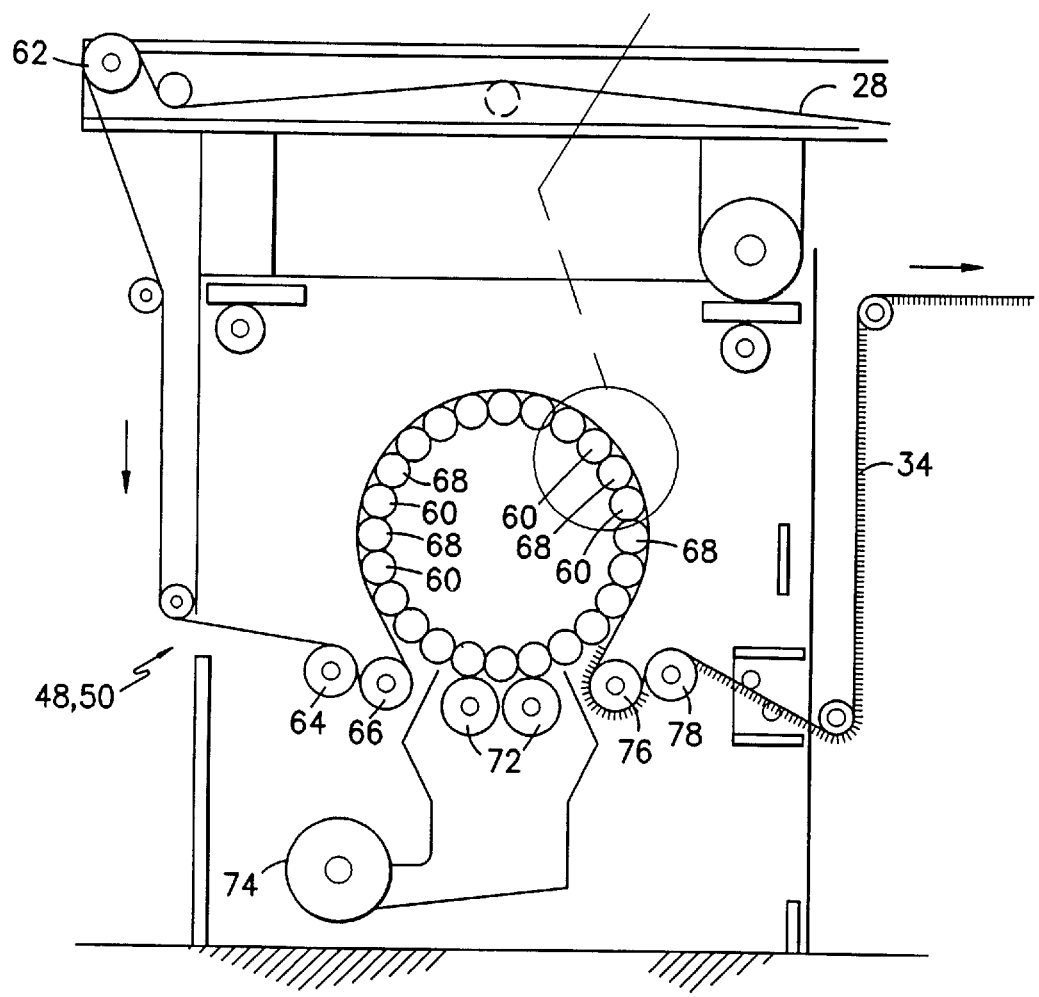
FIG. -6B-

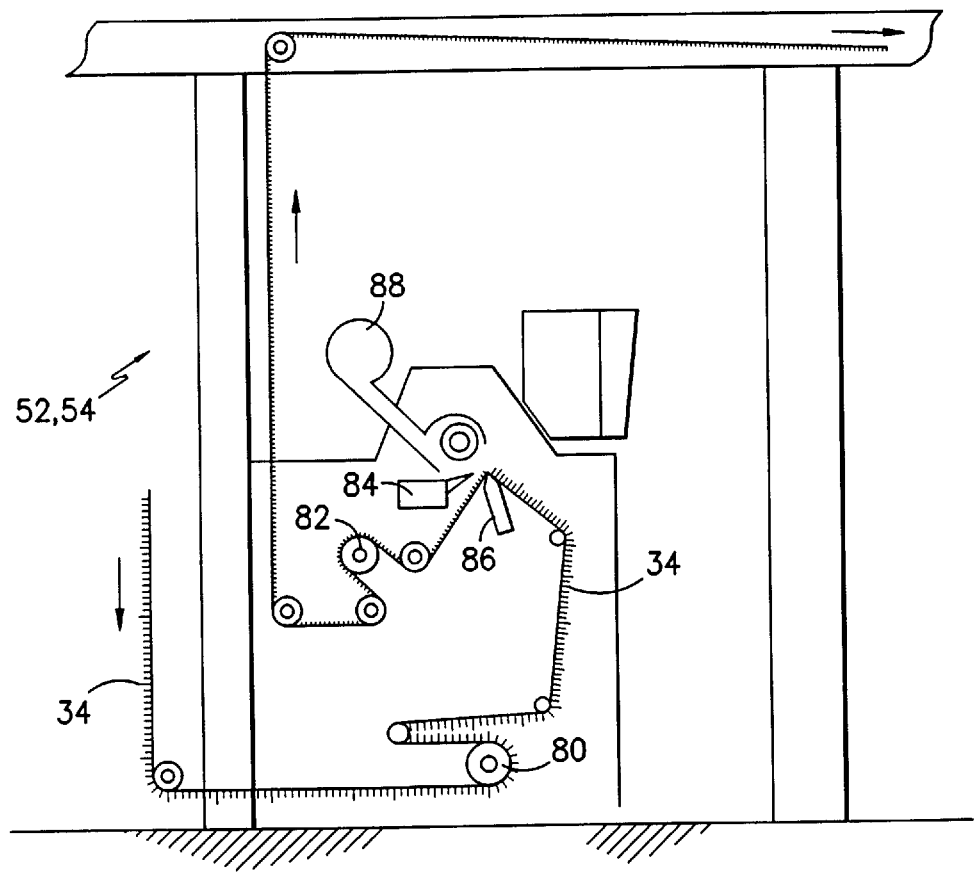
FIG. -7-

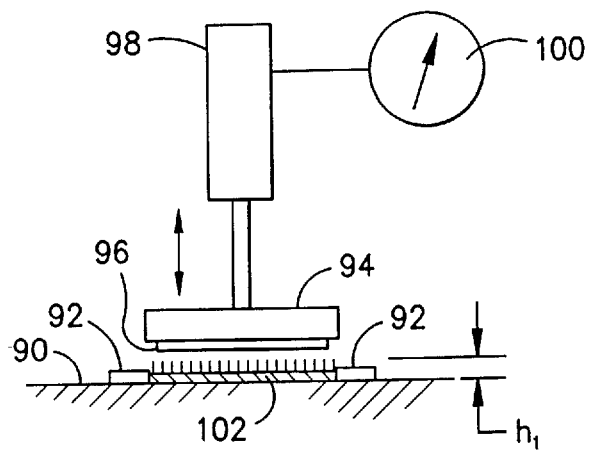
FIG. -8-
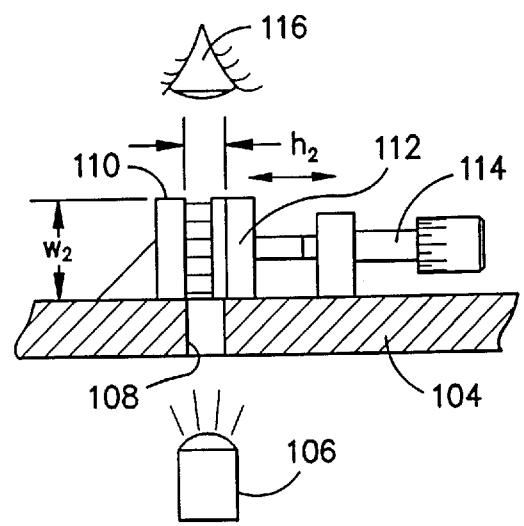
FIG. -9-
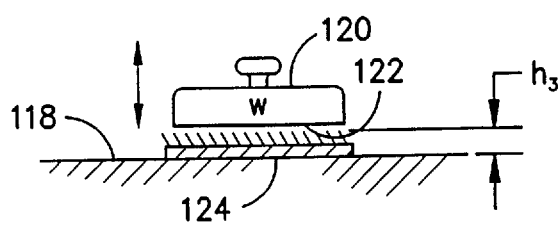
FIG. -10-
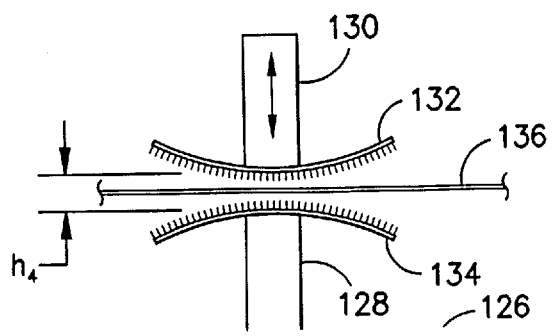
FIG. -11-

# FILM CARTRIDGE

CROSS REFERENCE TO RELATED APPLICATIONS

This application is a continuation-in-part of U.S. patent application Ser. No. 08/058,329 filed May 10, 1993, now abandoned.

DESCRIPTION

1. Technical Field

The invention relates to containers for light-sensitive strip or sheet materials. More particularly, the invention is concerned with such containers having an elongated opening through which the strip or sheet material may be withdrawn, with a strip of light-locking material on each side of the opening for preventing visible light from entering the container. The invention also relates to a method for making a light-lock material for such containers.

2. Background Art

Containers for light-sensitive strip or sheet materials, especially those for photographic films and papers, may be classified into two groups; that is, those for sheet film or paper and those for roll or scroll film or paper. Such containers commonly comprise an elongated opening or slit through which the strip or sheet material is withdrawn from or returned to the container. To prevent visible light from entering the container and prematurely exposing the light-sensitive material, light-locking or light-shielding members long have been provided on either side of the opening, between which the material is drawn.

FIGS. 1 and 2 illustrate one known type of photographic film container which includes such light-locking members. A spool 10 comprises a central core, not illustrated, on which is wound a strip 12 of photographic film. Spool 10 includes a pair of end flanges 14 from which extend hollow axial hubs 16. A preformed metal shell 18 comprises a pair of axially extending lips 20c, 20t between which an elongated opening or slit is defined in the completed container, through which strip 12 is withdrawn from or wound back into the container in use by the consumer. These axially extending lips are different in geometry, as shown in FIG. 2, lip 20c being folded or crimped back on itself and lip 20t being essentially tangent to the cylindrical preformed shell 18. Typically, preformed shell 18 has been formed from a substantially flat rectangular blank, not illustrated, on which lips 20c, 20t previously have been formed. To prevent leakage of light into the container, the opposed inner faces of lips 20c, 20t are covered in the familiar manner with strips 22 of light-locking material such as woven or knit black velvet which gently but firmly engages the surfaces of the film and prevents light leakage into the container. Such light locking materials have been made from various fabrics and are sometimes called teremp cloths. The fabrics typically have been dyed black to improve their imperviousness to visible light and have been made fairly soft or flexible so as not to scratch or otherwise damage the film when it is withdrawn from or rewound into the container. One common type of light locking material is woven or knit cut velvet. The ends of the magazine are closed by a pair of annular end caps 24, each having an aperture 26 for rotatably receiving a hub 16 and a circumferentially extending groove 25 and flange 27 for fixedly engaging the end edges of preformed shell 18.

Such containers are assembled by inserting a prewound spool of film axially into preformed shell 18 and then applying and staking end caps 24. As shown in FIG. 2, when the caps are applied, strips 22 are compressed against the lead portion of the film so that the light-locking material of strips 22 is compressed to establish a certain slot gap or width w1 between the opposed inner faces of lips 20c, 20t. The area of compressed contact between strips 22 has a width w2 in the direction of withdrawing the film. On the outside surface of caps 24, the walls of groove 25 define axially and peripherally extending flange 27 whose radially inner surface is deformed outwardly to stake the end cap to shell 18. In order to fit end caps 24 onto shell 18, strips 22 of light-locking material must be compressed together during assembly to less than half of width w1 by clamping from the outside, in order to close shell 18 sufficiently for installation of the caps.

While such light-locking materials have been used for many years in the photographic industry, several vexing, chronic problems have been encountered. For example, the commonly used cut velvet material comprises rows of upstanding tufts of cut fibers. The tufts are staggered, looking in the weft direction, which helps to block light from that direction. Such cut velvets typically have been made by weaving pile yarns between a pair of woven or knit base cloths and then cutting the pile yarns between the base cloths to produce two webs of cut pile velvet. This velvet then has been sheared to a desired pile height and napped to fluff the cut yarns from their ends down toward the base cloth and produce a more dense pile. This napping has been done with extreme care since too little fluffing will produce a velvet with poor compressibility and high pull force in the container, while too much fluffing will produce a velvet with poor resiliency. Though considerable effort has been made to finish such cut velvets from the top ends of the piles down to the base cloth, in some cut velvets of this type, visible light can pass diagonally, along paths with components in the warp and weft directions, between the rows of tufts near the base cloth of the material and into the container, thus exposing a portion of the lead end of the film strip. See FIG. 2A for a schematic illustration of a base cloth 21 having tufts 23 staggered in the weft direction with the diagonal light leakage paths indicated by the arrows. Passage of light along such diagonal leakage paths is sometimes called "corn-rowing". The diagonal paths may be at 30° to 45° to the weft direction of the base cloth, even in materials whose staggered tufts stop leakage in the weft direction. Such leakage is particularly troublesome when modern, highly sensitive films are used which can be exposed by quite small levels of light.

During slitting and cross-cutting of the known light-locking material to form strips of widths and lengths appropriate for installation on lips 20c, 20t, a considerable quantity of dirt has been generated in the form of fiber particles which are difficult to collect and may find their way onto the film in locations to produce flaws in a developed image. During assembly of the container, if the compression strength or compressibility of the light-locking material is too high, achieving adequate compression for installation of the end caps can result in undesired, permanent deformation of the shell which may make it interfere with the installation of the cap. Some velvets are of sufficiently low resiliency that following compression they do not spring back readily to a thickness sufficient to provide good light-locking. For example, the container of FIG. 1 typically is shipped in a package in which a lead portion of strip 12 extends outside the container and is wrapped back across lip 20c and partially around the container. This wrapping back of the lead portion tends to compress slightly the light-locking material on lip 20c. If the material has low resiliency, light leakage may occur when the lead portion is straightened in a lighted area prior to installation in a camera. Some cut velvets tend to be rather directional in their properties, due to the manner in which the materials are made. Thus, film moving out of the container may encounter a different resistance or pull force from the material of strips 22 than film moving into the container. This can be particularly troublesome with self-winding cameras where low pull force is desired in both directions. Finally, cut velvet light-locking materials tend to be quite expensive.

SUMMARY OF THE INVENTION

An object of the invention is to provide a container for light-sensitive material, the container having an improved light-locking material.

Another object of the invention is to provide a simple, reliable method for making such a light-locking material at low cost.

A further object of the invention is to provide such a container in which the light-locking material permits minimal light leakage.

Another object of the invention is to provide such a container in which the light-locking material has a sufficient pile density for good light-locking characteristics and yet not produce an increased quantity of loose fiber particles relative to known cut velvet material.

Still another object of the invention is to provide such a container in which the light-locking material exhibits an improved degree of compressibility.

Yet another object of the invention is to provide such a container in which the light-locking material exhibits an improved degree of resiliency.

A still further object of the invention is to provide such a container in which the properties of the light-locking material are more uniform with direction of movement of the light-sensitive material into or out of the container.

These objects are given only by way of illustrative examples; thus other desirable objects and advantages inherently achieved by the disclosed invention may occur or become apparent to those skilled in the art.

The scope of the invention is defined by the claims. A container for enclosing a strip or sheet of light sensitive material includes an elongated opening from the container for withdrawing the strip or sheet material, the opening having a pair of opposed inner faces; and a strip of light-locking material attached to each of the inner faces. In accordance with the invention, the light-locking material is a woven, napped and sheared fabric having floats and fibers of the floats raised from the base cloth to form a pile to prevent light from entering the container and exposing the light sensitive material. Napping such a fabric to pull up the floats and fibers from the base cloth produces a dense pile from the base cloth outward, which is superior to the prior art velvets which have been fluffed from the ends of the cut piles toward the base cloth. The light-locking material may be multiple shaft filling face satin weave fabric. A six shaft fabric is effective. The warp yarns of the fabric may be substantially 100% polyester and may be solution dyed. The fabric may comprise weft yarns of spun, staple length yarn. Also a warp faced satin weave could be used, if desired. The opening of the container has a gap or width between the inner faces and the light-locking material requires a peak compression force in the range of 10.67 to 80 lbs/in$^2$ (7.35×10$^4$ to 55.1×10$^4$ n/m$^2$) to compress an area of the light-locking material comparable in size to an area of contact between the strips attached to the inner faces, until the area has a compressed thickness of at most one half of the width between the inner faces. Preferably, the compressed thickness is in the range of 35 to 45% of the width of the opening. Materials with this degree of compressibility can be compressed during assembly of the container without causing undesired deformation of the shell of the container.

The strips of light-locking material are compressed into contact in an area with a first width in a direction of withdrawing the light-sensitive material; the opening has a second gap or width between the opposed inner faces; and the light locking material requires compression to half of the second width to prevent visible light from passing through the strip along a path having a component in a direction of the first width.

The strips of light-locking material are compressed into contact in an area with a first width in a direction of withdrawing the light-sensitive material; the opening has a second gap or width between the opposed inner faces; and the light-locking material, after being compressed to a thickness less than half of the second width and being held at that thickness for one hour at 160 degrees F., promptly returns to a decompressed thickness of at least half the second width, typically in less than a second, and prevents visible light from passing through the strip of light-locking material along a path having a component in a direction of the first width at the decompressed thickness. Recovery times as long as 3 to 5 seconds may be acceptable for materials to be used with less sensitive photographic films or papers.

The strips of light-locking material are compressed into contact in an area with a first width in a direction of withdrawing the light-sensitive material and the opening has a second gap or width between the opposed inner faces; and the strips of light-locking material, as compressed into contact with opposite sides of the light-sensitive material, produce a peak pull force in the range of 3.53 to 35.3 ounces (100 to 1000 gm) when the light-sensitive material is pulled 1.0 inch (25.4 mm) between the strips.

The method of the invention is useful for producing a pile fabric for use as a light locking material in a container for light-sensitive material and comprises the steps of providing a woven fabric; napping and shearing the surface of the woven fabric; taking up the napped and sheared fabric; again napping and shearing the previously napped and sheared surface of the fabric; and taking up the twice napped and sheared fabric. In one embodiment of the method, the woven fabric is napped and sheared at least three times. Preferably, during each napping and shearing step the woven fabric is napped twice and sheared twice. To minimize differences in properties with direction along the fabric, the woven fabric is provided as a web of extended length and the fabric is napped and sheared first in one direction along the length and second in the opposite direction along the length.

More generally, the method of the invention is useful for producing a pile fabric from flat-woven polyester fabric having fill yarn floats on a surface thereof and comprises the steps of providing the woven polyester fabric; napping and shearing the floats of the woven fabric by passing the fabric through a napping and shearing machine at least three times; and taking up the napped and sheared fabric. When the woven polyester fabric is provided as a web of extended length, the fabric is napped and sheared first in one direction along the length and second in the opposite direction along the length. Preferably, the napping and shearing machine has two stages of napping and two stages of shearing for each pass of the fabric and the fabric is passed through each of the stages at least three times.

The multiple napping and shearing of the woven fabric in accordance with the method of our invention provides a light-locking material or teremp cloth which exhibits improved light-locking characteristics. The base fabric is passed at least twice, preferably three times, through a napping and shearing arrangement. The napped, sheared fabric has a very dense, even pile which prevents the entry into a container for light-sensitive material of visible light which might prematurely expose the product.

Due to use of a light-locking material according to our invention, few waste pile yarns are created during manufacture of the material. Also, very few yarns come loose from the fabric when strips 22 are compressed against strip 12 at the outlet opening of the container. The fabric can be woven quickly and is easy to coat and bond to the inner faces of lips 20c, 20t. Thus, a container for light-sensitive material according to the invention can be manufactured at considerably lower cost as compared to containers using prior art light-locking materials.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 is an exploded perspective view of a known type of film container which is improved in accordance with the invention.

FIG. 2 is an end view, partially broken away, of a known type of film container which includes strips of the light-locking material of FIG. 3.

FIG. 2A is a schematic representation of a known cut velvet showing diagonal light paths.

FIG. 3 is a schematic view of a light-locking material produced in accordance with the invention.

FIG. 4 is a view along line 4—4 of FIG. 3.

FIG. 5 is a schematic representation of the napping and shearing arrangement for the fabric of FIG. 3 to produce the fabric of FIG. 4.

FIG. 6 is an enlarged side view of the napper shown in FIG. 5.

FIG. 7 is an enlarged side view of the shearer shown in FIG. 5.

FIG. 8 is a schematic view of an apparatus for measuring compressibility of the fabric of FIG. 4.

FIG. 9 is a schematic view of an apparatus for measuring the light locking capability of the fabric of FIG. 4.

FIG. 10 is a schematic view of an apparatus for measuring the resiliency of the fabric of FIG. 4.

FIG. 11 is a schematic view of an apparatus for measuring the force required to pull film between strips of the fabric of FIG. 4.

DESCRIPTION OF THE PREFERRED EMBODIMENTS

Figure 2B:
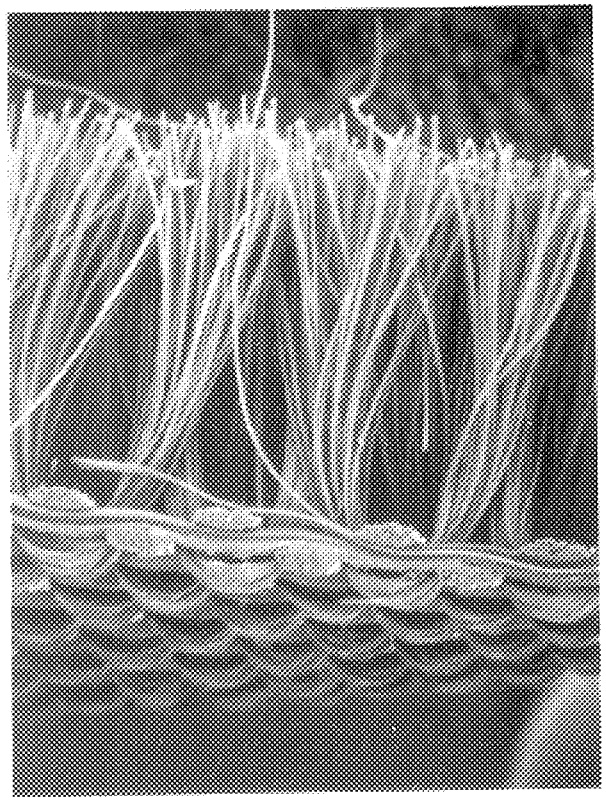
FIG. 2B is a photomicrograph showing the structure of a known cut velvet light-locking material.

The following is a detailed description of the preferred embodiments of the invention, reference being made to the drawings in which the same reference numerals identify the same elements of structure in each of the several Figures.

Looking now to FIG. 3, there is illustrated a six shaft filling face satin weave fabric 28 having warp yarns 30 and weft yarns 32. As illustrated, each weft yarn 32 comprises floats 33 which extend across a plurality of underlying warp yarns 30, five as illustrated, with the floats shifting at least two warp yarns in the weft direction on each successive row. Those skilled in the art will appreciate that other weave patterns could be used without departing from the scope of our invention. The fabric 28 after being woven is taken in wide widths from the weaving machine and successively dyed, lubricated dried, napped, sheared and heat set to produce the desired light-locking material. The pile fibers 34 are raised by napping and shearing floats 33 of fabric 28 to provide the light-locking material. After heat setting, the fabric is coated on the side opposite floats 33 and pile fibers 34 with an acrylic latex prime coat with carbon black filters to bind the fibers of the fabric. The fabric is then coated with a layer of an adhesive, such as a polyvinyl acetate heat activated adhesive. The coated fabric then is slit in the warp direction to provide ribbons having a width or widths suitable for installation on the opposed inner faces of lips 20c, 20t, with the warp direction of the fabric running axially along the lips. The fabric may be slit in any convenient manner; however, slitting ultrasonically produces clean cut edges. The ribbons are then cross-cut to provide strips 22 having an appropriate width or widths for installation on the opposed inner faces of lips 20c, 20t.

As indicated previously, the light-locking material is a woven fabric having a six shaft filling face satin weave, as shown in FIG. 3. Fabric 28 is 100% polyester with a singles textured warp yarn 30 of 150 denier, 34 filaments and a two-ply twenties spun fill or weft yarn 32 of 1.5 denier of 1.5 inch (38.1 mm) staple length. More generally the light-locking material of the invention includes a base cloth of intermeshed or entangled yarns and float yarns on a surface of the base cloth, the floats being napped and sheared to raise fibers therefrom to prevent light from entering an associated container of light sensitive material. Also the filament of the yarn can have various other shapes such as a trilobal, octolobal, dog bone, etc.

If it is desired to eliminate dyeing and drying of the woven fabric prior to napping and shearing, solution dyed polyester warp and fill yarn can be employed. For example, warp yarn 30 can be singles textured, 150 denier, 33 filament black polyester and weft yarn 32 can be two-ply twenties, 1.5 denier of 2.0 inch (50.8 mm) staple length black polyester fiber. Solution dyed fabrics are less expensive to manufacture and ensure less tendency for reaction between the dyes in the light-lock material and the chemical constituents of photographic film or paper.

Figure 4A:
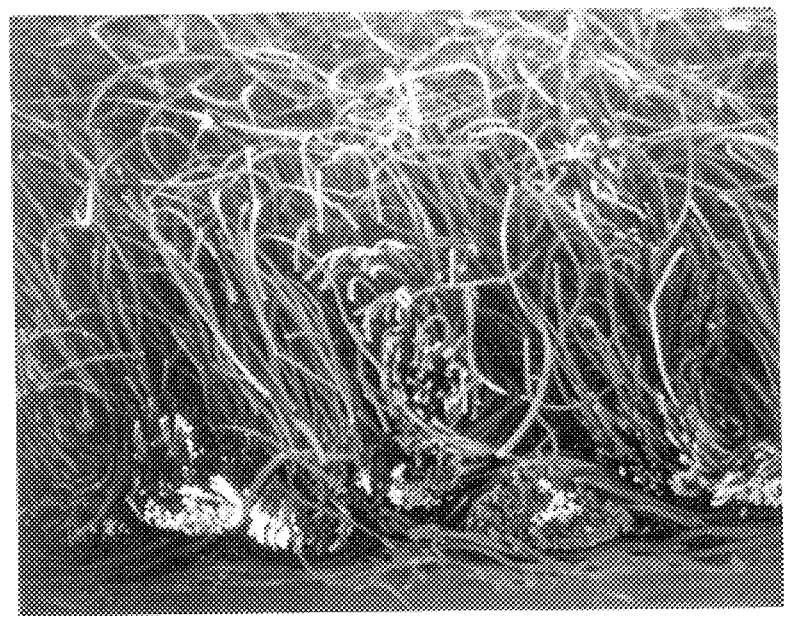
FIG. 4A is a photomicrograph showing the structure of the light-locking material of FIG. 4.

Fabric 28 is napped and sheared to produce the light-locking material shown in FIGS. 3 and 4, which is useful in the container of FIGS. 1 and 2. The method of our invention ensures that the density and height of the piles of the napped and sheared fabric will be sufficient to enable the material to perform effectively. For example, for 35 mm film, a pile height of about 0.065 inch (1.65 mm) after napping, shearing and prime coating has been found to produce good light-locking characteristics. FIGS. 5 to 7 illustrate schematically an apparatus suitable for practicing the method of our invention to produce such a light-locking material. The woven fabric 28 is provided as a web of extended length on a take-up roll 38 which is placed in a roll stand 40 to deliver the fabric to an accumulator 42 for delivery to some downstream nappers and shearers. Accumulator 42, as well as accumulator 44 on the outlet end, accumulates fabric therein to compensate for variations in roll speed and web tension, as well as momentary stops of the machinery.

The napping and shearing arrangement 46 illustrated in FIG. 5 comprises commercially available equipment and includes essentially accumulators 42, 44; nappers 48, 50; and shearers 52, 54. Fabric 28 is supplied from take-up roll 38 in sequence to accumulator 42; nappers 48, 50; shearers 52, 54; accumulator 44 and, after napping and shearing, to take-up roll 56 on roll stand 58.

It should be noted that fabric 28 on each pass through napping and shearing arrangement 46 goes through at least two nappers and then through at least two shearers. It has been found that to provide an efficient light-lock material, the fabric should be run through the napping and shearing arrangement at least twice and preferably three times to provide the proper density and height of the piles 34 and to prevent rowing or some other repeating effect on the pile 34. By "rowing" is meant the formation of extended open surface slots or rows between lines of piles, through which visible light may leak. Then, since take-up roll 56 on the outlet end of each pass is placed in the supply roll stand 40 for the next pass through napping and shearing arrangement 46, the surface of the fabric is run through the arrangement in a direction opposite to the previous run in order to equalize the effect of the counter napper rolls 60.

Referring now to FIGS. 6 and 7, the nappers and shearers are shown in more detail. Nappers 48, 50 are identical and illustrated in FIG. 6; and shearers, 52, 54 are identical and illustrated in FIG. 7. Both nappers and shearers are commercially available machines and do not themselves form part of our invention, other than our method of using the machines to produce the desired light-locking material.

Each napper 48, 50 receives fabric 28 from the take-up roll or the next adjacent napper with the side of the fabric with floats 33 on top; so that, the driven rolls 62, 64, 66 will place the float side adjacent the napper rolls 60, 68 in the rotating napper roll support cylinder which is rotating at a rate higher than that of the napper rolls. Napper rolls 58, 60 have curved forks or tines 70 thereon which pull the fibers and floats upwardly from the float side of the fabric to form piles 34. Raising the floats in this manner produces considerable width-wise shrinkage which improves pile density and substantially eliminates corn-rowing. Adjacent napper rolls 60, 68 have forks or tines 70 slanted in opposite directions; so that, when the oppositely driven rolls 60, 68 act on the fabric a more random pile is formed from the base cloth to the face of the fabric, which prevents light leakage from all directions as clearly shown in FIG. 4A. The speed of the napper rolls is controlled to provide the desired effect on the face of the napped fabric. A pair of brush rolls 72 are mounted adjacent to the bottom of the nappers 48, 50 between the entrance and the exit for the fabric, to brush loose fibers from between the forks or tines 70. The fibers are then removed by the action of a suction cleaner 74. When the fabric 28 has been napped by the second napper 50, the driven rollers 76, 78 deliver the fabric with the pile 34 facing downward to the first shearer 52.

The passage of fabric 28 through shearer 52 is controlled essentially by driven draw rolls 80, 82 between which pile 34 is sheared by a shearing tool 84 as the fabric passes over a shearing bed 86. Mounted above shearing tool 84 is a suction cleaner 88 to vacuum up loose fiber ends cut from the tips of pile 34. The napped and sheared fabric then passes from the second shearer into accumulator 44 and then onto take-up roll 56.

Various control devices may be used to control the speed of the fabric through the napping and shearing arrangement 46, to sense the pile height to provide for adjustment, and to provide edge guides.

The light-locking material made in accordance with the method of the invention has a pile height and density and other characteristic properties which particularly suit it for use in containers according to the invention. To assure the adequacy of the light-locking material for use in such containers, tests have been developed to measure fabric properties such as compressibility, light-lock capability, resiliency and pull force. Apparatus for performing such tests are illustrated in FIGS. 8 to 11. While the description of the apparatus of FIGS. 8 to 11 mentions various dimensions corresponding to the container of FIGS. 1 and 3, those skilled in the art will appreciate that the apparatus may be readily adapted to test light-lock materials for other styles of containers for light-sensitive film and paper.

FIG. 8 illustrates schematically an apparatus for measuring the compressibility of a light-locking material. Such materials must be able to compress in response to applied forces within certain limits, to enable the container to be assembled properly. Mounted on a support table 90 is a sample retaining frame 92 having a height h1 slightly less than a test compression height for a sample of light-locking material. Above frame 92, a compression foot 94 is provided with a platen 96 having a width corresponding to width w2 shown in FIG. 3 and a length corresponding to the axial length of lips 20c, 20t. That is, the area of platen 96 corresponds to the area of light-locking material compressed between the lips when the container is assembled. For 35 mm film, this area would be about 1.5 inch by 0.125 inch (38.2 by 3.175 mm). Retaining frame 92 is sized to allow platen 96 to pass into the frame opening. For example, a sample could be compressed to a thickness of at most one-half of width w1 shown in FIG. 2, which would be about the amount each strip 22 would be compressed in an assembled container. For 35 mm film applications, this compressed thickness would be less than half width w1 shown in FIG. 2, or less than about 0.045 inch (1.02 mm), to permit end cap installation. An actuator 98 is suitably attached to compression foot 94 and a maximum force indicator 100 measures the maximum force applied by actuator 98. To test the compressibility of a light-locking material, a sample 102 is placed within frame 92 with pile 34 facing platen 96. The sample should have an area equal to or greater than that of platen 96. Actuator 98 is operated to press platen 96 against the sample and compress the sample until the underside of platen 96 reaches a desired compression eighth above table 90. The maximum force is noted from indicator 100. For example, to avoid potential problems during installation of end caps 24, such maximum force preferably should be in a range of 10.67 to 80 lbs/in$^2$ (7.35×10$^4$ to 55.1×10$^4$ n/m$^2$) and more preferably less than 53.33 lbs/in$^2$ (36.7×10$^4$ n/m$^2$). However, prior art light-locking materials required forces in a range of 10.67 to 117.37 lbs/in$^2$ (7.35×10$^4$ to 80.87×10$^4$ n/m$^2$), meaning that compressing some of such materials could be expected to damage the container. For the material according to the invention, good compressibility is indicated by a peak compression force in the range of 16 to 26.67 lbs/in$^2$ (11.03×10$^4$ to 18.37×10$^4$ n/m$^2$) when sample 102 is compressed to 35 to 45% of width w1.

FIG. 9 illustrates an apparatus for measuring the light-lock capability of a light-locking material. Such material should prevent visible light from passing when installed in a container. A support table 104 is positioned above a bright light source 106 having a power, for example, of 2,000 foot/candles (21,520 lumens/m$^2$). A slit or row of bores 108 is provided through table 104. On the opposite side of table 104 from source 106, a fixed stop plate 110 and a movable platen 112 are positioned on opposite sides of bores 108. As in the case of platen 96, the areas of plate 110 and platen 112 correspond to the area of light-locking material compressed between the lips when the container is assembled. A sample of light-locking material, having width w2 shown in FIG. 3 and a length to provide such an area, is placed between plate 110 and platen 112. A micrometer 114 is used to force movable platen 112 toward stop plate 110 until a test compression height h2 is reached, such as a thickness of one-half of width w1 shown in FIG. 3. With a sample compressed to this extent, a human observer 116 then looks for visible light coming through the compressed sample from any angle and particularly from the direction of width w2. Light-locking materials according to the invention essentially prevent visible light from passing when compressed to this extent; whereas, many prior art light-locking materials allow visible light to pass at some angles.

FIG. 10 illustrates an apparatus for measuring the resiliency of a light-locking material.

After compression, a good light-locking material should spring back to a height sufficient to ensure good light-locking. A support table 118 is positioned beneath a body 120 having a weight in the range of 2.82 to 3.52 ounces (80 to 100 gm). A contact surface 122 of body 120 has an area which corresponds to the area of light-locking material compressed between the lips when the container is assembled. A sample 124 of light-locking material is placed beneath body 120, whose weight is selected to ensure that the sample will compress to less than half width w1 of FIG. 3. With the weight applied, the sample is then held for one hour at 160° F. (71.1° C.). The weight is then moved away from table 118 to a distance h3, corresponding to half width w1. Promptly, typically in less than a second, the resiliency of an acceptable sample should cause the sample return to a decompressed thickness h3. Then, when tested in the manner described with reference to FIG. 9, the decompressed sample should prevent visible light from passing. For less sensitive photographic films and papers, decompression times as long as 3 to 5 seconds may be acceptable.

FIG. 11 illustrates an apparatus for measuring the pull force characteristic of a light-locking material. This characteristic is important, for example, to ensure that film car be easily withdrawn from and returned to the container between strips 22. A support table 126 is positioned beneath a fixed jaw 128 which, in turn, is positioned beneath movable jaw 130. Each of the opposed faces of the jaws has an area which corresponds to the area of light-locking material compressed between the lips when the container is assembled. Samples 132, 134 of light-locking materials are laid over the opposed faces of jaws 128, 130 and a sample 136 of perforated film is placed between samples 132, 134. The jaws are then closed by means not illustrated to a gap h4, greatly exaggerated as illustrated, which corresponds to width w1 shown in FIG. 2. Sample 136 is then pulled 1.0 inch (25.4 mm) in either direction between the jaws and the peak pull force is measured. A peak pull force in the range of 8.53 to 35.3 ounces (100 to 1000 gm) indicates an acceptable light-locking material.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A container for enclosing a strip or sheet of light sensitive material of the type including an elongated opening from said container for withdrawing said light-sensitive material, said opening having a pair of opposed inner faces; and a strip of light-lock material attached to each of said inner faces, characterized by: said light-locking material being an intermeshed, napped and sheared fabric having floats with fibers raised therefrom to form a pile to prevent light from entering said container and exposing said light-sensitive material, said opening having a width between said opposed inner faces and said light-locking material requiring a peak compression force in the range of 16.0 to 26.67/in$^2$ (11.0×10$^4$ to 18.37×10$^4$ n/m2) to compress an area of said light-locking material comparable in size to an area of contact between said strips attached to said inner faces, until said area has a compressed thickness of at most one-half of said width of said opening.

2. The container of claim 1, wherein said compressed thickness is 35 to 45% of said width of said opening.

3. The container of claim 1, wherein said strips of light-locking material are compressed into contact in an area with a first width in a direction of withdrawing said light-sensitive material and said opening has a second width between said opposed inner faces; and said light-locking material requires compression to a thickness of half of said second width to prevent visible light from passing through said compressed strip along a path having a component in a direction of said first width.

4. The container of claim 1, wherein said strips of light-locking material are compressed into contact in an area with a first width in a direction of withdrawing said light-sensitive material and said opening has a second width between said opposed inner faces; and said light-locking material, after being compressed to a thickness less than half of said second width and being held at said thickness for one hour at 160 degrees F., promptly returns to a decompressed thickness of at least half said second width and prevents visible light from passing through said strip of light-locking material along a path having a component in a direction of said first width at said decompressed thickness.

5. The container of claim 1, wherein said strips of light-looking material are compressed into contact in an area with a first width in a direction of withdrawing said light-sensitive material and said opening has a second width between said opposed inner faces; and said strips of light-locking material, as compressed into contact with opposite sides of said light-sensitive material, produce a peak pull force in the range of 3.53 to 35.3 ounces (100 to 1000 gm) when said light-sensitive material is pulled 1.0 inch (25.4 mm) between said strips.

6. The container of claim 1, wherein said strips of light-locking material are compressed into contact in an area with a first width in a direction of withdrawing said light-sensitive material and said opening has a second width between said opposed inner faces; said light-locking material requires compression to a thickness of half of said second width to prevent visible light from passing through said compressed strip along a path having a component in a direction of said first width; said light-locking material, after being compressed to a thickness less than half of said second width and being held at said thickness for one hour at 160 degrees F., promptly returns to a decompressed thickness of at least half said second width and prevents light from passing through said strip of light-locking material along a path having a component in a direction of said first width at said decompressed thickness.

7. The container of claim 4, wherein said strips of light-locking material are compressed into contact in an area with a first width in a direction of withdrawing said light-sensitive material and said opening has a second width between said opposed inner faces; and said strips of light-locking material, as compressed into contact with opposite sides of said light-sensitive material, produce a peak pull force in the range of 3.53 to 35.3 ounces (100 to 1000 gm) when said light-sensitive material is pulled 1.0 inch (25.4 mm) between said strips.

8. The container of claim 6, wherein said strips of light-locking material are compressed into contact in an area with a first width in a direction of withdrawing said light-sensitive material and said opening has a second width between said opposed inner faces; and said strips of light-locking material, as compressed into contact with opposite sides of said light-sensitive material, produce a peak pull force in the range of 3.53 to 35.3 ounces (100 to 1000 gm) when said light-sensitive material is pulled 1.0 inch (25.4 mm) between said strips.

9. The container of claim 3, wherein said strips of light-locking material are compressed into contact in an area with a first width in a direction of withdrawing said light-sensitive material and said opening has a second width between said opposed inner faces; and said strips of light-locking material, as compressed into contact with opposite sides of said light-sensitive material, produce a peak pull force in the range of 3.53 to 35.3 ounces (100 to 1000 gm) when said light-sensitive material is pulled 1.0 inch (25.4 mm) between said strips.

* * * * *